Patented Aug. 16, 1927.

1,638,849

UNITED STATES PATENT OFFICE.

EARL J. HAVERSTICK, OF OAKMONT, PENNSYLVANIA, ASSIGNOR TO WESTINGHOUSE ELECTRIC & MANUFACTURING COMPANY, A CORPORATION OF PENNSYLVANIA.

METHOD OF MAKING RESISTOR ELEMENTS.

No Drawing.    Application filed May 7, 1923. Serial No. 637,376.

This invention relates to resistors of non-metallic materials, more particularly to a method of making the same.

In the copending application of J. Slepian, Serial No. 637,147, filed May 7, 1923, for resistor material, and assigned to the Westinghouse Electric & Manufacturing Company, there is described a method of making resistors which consists in providing a mixture of lampblack and flint. Water glass or other suitable binder is then mixed with the resistor material and the same is molded under pressure to the desired form. The resistors are then dried and are treated with ammonium chloride to decrease the sensitiveness thereof to changes in humidity of the atmosphere.

I have found that, when the amount of water glass used in the mixture is such as to give a maximum of strength to the finished resistors, considerable difficulty is experienced in the molding because of a tendency of the resistors to adhere to the mold, causing a considerable loss of molded resistors because of breakage.

My new method is intended to obviate this difficulty, it being among the objects thereof to devise a method of molding resistors which shall obviate the difficulty of the resistors adhering to the mold and which shall provide resistors of the requisite strength.

In practising my invention, I provide a mixture of lampblack and flint and add to the same the minimum amount of water glass solution sufficient to cause the particles of resistor material to adhere when subjected to the molding pressure. The molded resistors may be removed from the mold without any difficulty of the same adhering thereto because the amount of binder in the mixture is so small that the material is comparatively dry and non-adherent except under heavy pressure.

Resistors made in this manner are very weak mechanically and must be handled with great care. In order to strengthen the same, I immerse the resistors in a fairly strong solution of water glass until they become saturated, after which they are removed from the solution and dried. This method provides the requisite strength of the resistors and makes the requirements for molding the same independent of the requirements for the strength thereof.

A specific example of the application of my invention is as follows: I provide a mixture of lampblack and flint in the proper proportions to give the desired resistivity in the final product. A mixture of approximately 80 pounds of flint and 5 pounds of lampblack which I use is calculated to give a resistivity of 50 ohms per cc. To this mixture, I add a solution of water glass consisting of approximately 16 pounds of commercial water glass solution, specific gravity 1.4, and two pounds of water, the amount of binder solution being about 16% of the molding mixture. Resistors are then molded from the mixture under the requisite pressure and the same are removed from the mold, there being no tendency for the same to adhere to the mold because of the small amount of binder used. The resistors are then baked for a period of several hours. I then prepare a water glass solution having a lower specific gravity and immerse the molded resistors therein for a sufficient length of time, preferably in a vacuum, to saturate the same, after which they are rinsed in a stream of hot water to remove the excess water glass from the surface thereof. They are immediately dried at a temperature of about 150° to 200° C.

My method of making resistors is no more expensive than the method hitherto used and results in a much more rapid production of resistors with very little loss by breakage. The finished resistors have the necessary strength for withstanding rough handling.

Although I have described my invention, setting forth a specific embodiment thereof, it is obvious that my invention is not limited to the details set forth. I may vary the proportions of ingredients to provide resistors of different resistivity and the amounts and strengths of water glass solution or other similar binder may also be varied within certain limits. It is advisable to vary the amount of water glass solution used in the mixture to neutralize the effects of differences in humidity of the atmosphere at different times. When the humidity is high, a smaller amount of binder should be used because the evaporation thereof under such conditions is less and, therefore, the material would have a greater tendency to adhere to the mold. These and other details of my invention may be varied to suit various conditions.

I claim as my invention:

1. The method of making molded composite articles which comprises mixing, with a body material, a moldable binding material in insufficient quantities to provide the ultimate strength desired or to adhere to the mold, placing the said mixture in a mold, causing the same to harden in said mold, subsequently impregnating the resulting molded structure with a liquid binding material which is susceptible of being subsequently hardened, and causing the impregnating material absorbed in said molded article to become hardened.

2. A method of making resistors which comprises making a mixture of materials calculated to give the proper resistivity, adding a small amount of a binder thereto, forming the resistor and then strengthening the same by adding additional binder thereto.

3. A method of making resistors which comprises making a mixture of materials calculated to give the proper resistivity, adding a small amount of a binder thereto, forming the resistor and then strengthening the same by immersing the resistor in a solution of the binder.

4. A method of making resistors which comprises making a mixture of materials calculated to give the proper resistivity, adding a small amount of a binder thereto, forming the resistor and then strengthening the same by immersing the resistor in a solution of the binder and then drying the same.

5. A method of making resistors which comprises making a mixture of materials calculated to give the proper resistivity, adding a small amount of a binder thereto, forming the resistor and then strengthening the same by saturating the resistor in a solution of the binder.

6. A method of making resistors which comprises making a mixture of materials calculated to give the proper resistivity, adding a small amount of a binder thereto, forming the resistor and then strengthening the same by immersing the resistor in a solution of the binder, washing and then drying the same.

7. A method of making resistors which comprises making a mixture of materials calculated to give the proper resistivity, adding a small amount of a water glass solution thereto, forming the resistor and then strengthening the same by immersing the resistor in a water glass solution.

8. A method of making resistors which comprises making a mixture of materials calculated to give the proper resistivity, adding a small amount of a water glass solution thereto, forming the resistor, strengthening the same by immersing the resistor in a water glass solution and then washing the same.

9. A method of making resistors which comprises making a mixture of materials calculated to give the proper resistivity, adding a small amount of a water glass solution thereto, forming the resistor, strengthening the same by immersing the resistor in a water glass solution, washing the same in hot water and then drying.

10. A method of making resistors which comprises making a mixture of materials calculated to give the proper resistivity, adding a small amount of a water glass solution thereto, forming the resistor, strengthening the same by immersing the resistor in a water glass solution, washing the same in hot water and then drying at a temperature of 150°–200° C.

11. A method of making resistors which comprises making a mixture of materials calculated to give the proper resistivity, adding a small amount of a binder thereto, forming the resistor and then strengthening the same by immersing the resistor in a solution of the binder in a vacuum.

In testimony whereof, I have hereunto subscribed my name this 27th day of April, 1923.

EARL J. HAVERSTICK.